United States Patent
Wiltshire

[15] 3,673,673
[45] July 4, 1972

[54] METHOD OF INSERTING A FLEXIBLE PREFORM IN A MOLD

[72] Inventor: Arthur J. Wiltshire, Cleveland, Ohio
[73] Assignee: Structural Fibers, Inc., Chardon, Ohio
[22] Filed: Feb. 4, 1970
[21] Appl. No.: 8,670

[52] U.S. Cl. ..............................................29/451, 29/235
[51] Int. Cl. ...................................................B23p 11/02
[58] Field of Search ................................29/235, 451, 523

[56] References Cited

UNITED STATES PATENTS

| | | | |
|---|---|---|---|
| 1,074,505 | 9/1913 | Kempshall | 29/523 UX |
| 2,977,994 | 4/1961 | Xenis | 29/451 UX |
| 3,145,464 | 8/1964 | Green | 29/235 X |

*Primary Examiner*—Charlie T. Moon
*Attorney*—McNenny, Farrington, Pearne & Gordon

[57] ABSTRACT

A method for inserting a flexible, oversized preform into an opening in a hollow mold is disclosed. The oversized preform is initially formed so as to have a configuration similar to that of the interior surfaces of the mold. The cross sectional size of the preform relative to the mold is temporarily reduced by forming an inwardly projecting furrow in the preform so that the preform may be inserted into the mold. An assembly for inserting the preform into the mold and reducing the cross sectional size of the preform as it is inserted into the mold is also disclosed.

7 Claims, 3 Drawing Figures

PATENTED JUL 4 1972 3,673,673

INVENTOR.
ARTHUR J. WILTSHIRE
BY
McNENNY, FARRINGTON, PEARNE & GORDON

ATTORNEYS

METHOD OF INSERTING A FLEXIBLE PREFORM IN A MOLD

BACKGROUND OF THE INVENTION

This invention relates generally to the molding of fiber-reinforced, plastic articles, such as tanks or the like, wherein a fiber preform is subsequently impregnated with plastic material. More particularly, a novel and improved method and assembly for inserting a flexible, oversized preform into a mold are disclosed.

Although this invention is concerned with the molding of fiber-reinforced plastic articles generally, it will be discussed herein with particular reference to the molding of fiber-reinforced plastic tanks.

PRIOR ART

In the molding of fiber-reinforced, plastic articles such as tanks, one commonly used method includes initially forming a hollow preform. In the case of fiber-reinforced, cylindrical tanks, the preform includes a tubular sidewall portion having an integrally formed end wall at one end. The preform consists of a wall formed by a multitude of short lengths of fibers randomly oriented in the wall and bonded by a settable resin which holds the fibers together but which does not fill the voids between the fibers.

One method of forming a preform which is particularly suited to commercial production involves the step of providing a perforated form which is rotated about its longitudinal axis while a vacuum is applied internally. A fiber chopper cuts a continuous strand of fiber-reinforcing material, such as a glass fiber filament, into short lengths and directs the chopped fibers toward the rotating form. The vacuum applied to the perforated form causes the fibers to be laid up on the form in a random manner. A settable binder resin is sprayed onto the fibers as they are deposited on the form. The vacuum applied to the perforated form, the amount of resin spray, and the amount of fibers deposited on the form may be controlled so that the preform is formed initially to have a configuration generally similar to the interior cavity of the mold.

After the binder is cured, the preform is removed from the form and is then inserted into the mold and compressed against the inner surfaces of the mold by expanding an inflatable bag within the preform. A settable resin is then caused to flow through the preform and the resin is subsequently cured. A more detailed description of the preform fabrication technique is generally set forth in the copending application of Arthur J. Wiltshire et al., Ser. No. 742,692 filed July 5 1968.

When fiber-reinforced plastic articles are fabricated in this manner, the preform must be formed so as to satisfy rigorous dimension requirements. In particular, the exterior dimensions of the preform must be substantially equal to the interior dimensions of the mold and lie within a narrow tolerance range.

If the preform is oversized, it cannot be inserted into the mold and must be discarded. There is no economical way to reshape the preform, nor is there a method of salvaging the materials forming the preform. Consequently, valuable production time and materials are lost.

If the preform's exterior dimensions are substantially equal to the interior dimensions of the mold, the preform may be carefully inserted into the mold. Since the exterior surface of the preform may be disrupted or torn during the inserting process, an experienced assemblyman is required to carefully position the preform in the mold. Consequently, in this instance, the preform inserting process is slow and requires a skilled assemblyman's services. In addition, there still exists the possibility that the preform may be torn during the process so as to render it unusable.

The difficulties encountered in forming a preform with exterior dimensions substantially equal to the interior dimensions of the interior of the mold may be fully appreciated when considered in view of the preform fabrication technique described above. As there noted, the preform is formed by depositing fibers on a rotating form and spraying the deposited fibers with a resin binder. Consequently, the exterior preform dimensions are a function of several independent variables none of which readily lend themselves to precise dimensional control. This is especially critical in view of the fact that a typical mold having an 8.275 inch diameter has a tolerance of —0 to +0.005 inch.

Although it is desirable to form the preform with exterior dimensions substantially equal to the interior dimensions of the mold so as to provide a minimum of clearance, several additional fabrication problems arise if the preform is undersized. For example, if the preform is in fact too small, it may split when the inflatable bag is inserted into the preform and expanded so as to compress the preform against the inner surfaces of the mold. Consequently, the final product will not be fiber-reinforced in the area of the split and a weak point may exist in the structure so as to render the product unusable. In addition, if the preform is undersized but does not split when subjected to internal bag pressure, a second structural defect may arise which will also render the final product useless. In this instance, the undersized preform fails to uniformly contact the inner surfaces of the mold when bag pressure is applied and resin-rich localized areas at the exterior surface of the final product result. The resin-rich areas will not be adequately fiber-reinforced, and the final product may have a tendency to crack in these areas.

Consequently, according to the methods of the prior art, it was considered necessary that the exterior dimensions of the preform be substantially equal to the interior dimensions of the mold and be within a narrow tolerance range. However, the maintenance of this narrow tolerance range is extremely difficult in view of the preform fabrication technique and the nebulous value of the maximum amount of acceptable clearance.

SUMMARY OF THE INVENTION

The present invention provides a method and an assembly for inserting a flexible, oversized preform into a hollow mold. According to the present invention, the cross sectional size of the preform is temporarily reduced so that it may be easily inserted into the mold. This reduction in the cross sectional size of the preform is provided by forming an inwardly projecting furrow in the preform to reduce the cross sectional size of the preform by gathering portions of the preform into the furrow.

The present invention also provides an assembly for inserting the flexible, oversized preform into the mold. The assembly includes an inserting mandrel which has exterior dimensions less than the interior dimensions of the mold and the hollow preform so that the mandrel may fit within the preform. According to the preferred embodiment of the present invention, the mandrel provides an aperture extending along its outer peripheral surface. The assembly also includes a paddle dimensioned to coact in sliding relationship with the aperture of the inserting mandrel. The paddle provides a surface which projects towards the aperture. The paddle is positioned adjacent to the open end of the hollow mold and along the interior surface of the mold. The preform is positioned over the inserting mandrel and inserted into the mold so that the aperture of the inserting mandrel and the paddle are aligned. The preform will lie intermediate the aperture of the mandrel and the paddle, which coact so as to form an inwardly extending furrow in the preform as it is inserted into the mold. In this manner, the cross sectional size of the preform is temporarily reduced so that it will fit into the mold. The inserting mandrel and the paddle may then be withdrawn from the mold. An inflatable bag is then inserted within the preform and inflated so as to force the preform against the interior surface of the mold. The subsequent molding operations as described above may then be performed.

The method of the present invention eliminates the problems existing in the prior art which are indicated above. Initially, it may be noted that the tolerance range with respect to preform size is substantially increased. This is true since the upper limit of the tolerance range is no longer limited or fixed by the interior size of the mold. Consequently, many of the preforms which were formerly rejected as being oversized may be used to form satisfactory end products.

Since the upper limit of the tolerance size range of preforms has been increased by the method of the present invention, the preforms may be consistently made within the upper portions of this tolerance range. Therefore, the problems associated with undersized preforms are substantially eliminated.

It may also be noted that when the preform inserting assembly of the present invention is employed, the preform may be quickly and accurately positioned inside the mold. As a result, the preform inserting process will entail a minimum of production time and will not require the services of a skilled assemblyman.

Other advantages of this invention will become apparent from the following detailed description and the accompanying drawings.

DETAILED DESCRIPTION OF THE DRAWINGS

Figure 1:
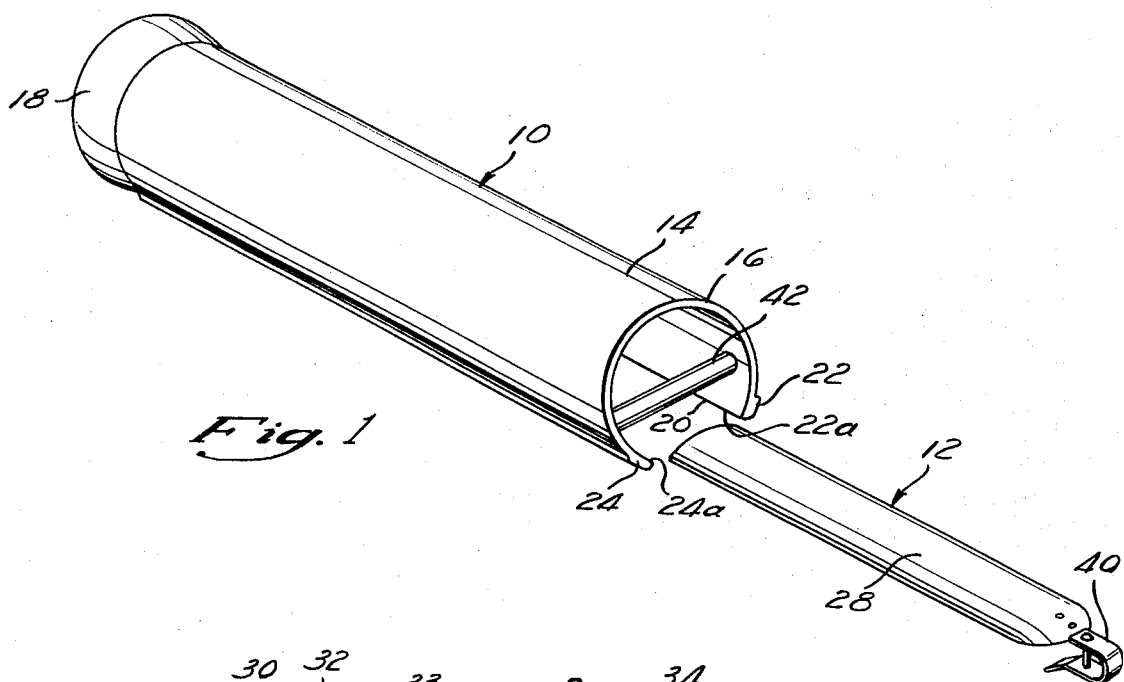
FIG. 1 is a perspective view of an inserting mandrel and a paddle according to the present invention.

FIG. 1 illustrates the preferred embodiment of an assembly which is useful in inserting an oversized preform into a hollow mold. This assembly is particularly adapted for the manufacture of tanks of the type often used for water softeners or the like. The illustrated assembly includes a hollow inserting mandrel 10 and a paddle 12. The inserting mandrel 10 includes a cylindrical portion 14 extending to a rearward open end 16 and a forward end 18. The forward end 18 is substantially dome-shaped and closed having an exterior radial dimension which may be greater than that of the cylindrical portion 14.

The inserting mandrel 10 is substantially hollow and provides an aperture 20 extending into the hollow interior of the mandrel. The aperture 20 extends axially along the cylindrical portion 14 from the forward face 18 to the rearward face 16. Adjacent to the periphery of the aperture 20 along the cylindrical portion 14 there are mandrel support guides 22 and 24 which project radially outward. The mandrel support guides provide the cylindrical portion 14 with a radial dimension at the plane of the aperture 20 substantially equal to the exterior radial dimension of the forward end 18. Therefore, the aperture 20 is defined by coplanar edges 22a and 24a of the mandrel support guides 22 and 24 along the cylindrical portion 14 of the inserting mandrel and the forward edge of the aperture is defined by the edge 26 of the forward end face 18. It should be noted that the aperture 20 may be formed merely by a relieved portion in the exterior peripheral surface of the cylindrical portion 14 and the forward end 18 may have peripheral dimensions similar to those of the aperture 20.

The paddle 12 is provided with peripheral dimensions that substantially mate with the aperture 20. In the embodiment illustrated in FIG. 1, the paddle 12 has a substantially rectangular shape and provides an arcuate projecting surface 28. The projecting surface 28 extends towards the aperture 20 when the paddle and the inserting mandrel are employed in accordance with the method of this invention. The paddle 12 may have an axial length which is equal to about one-half to about three-fourths of the axial length of the aperture 20.

Figure 2:
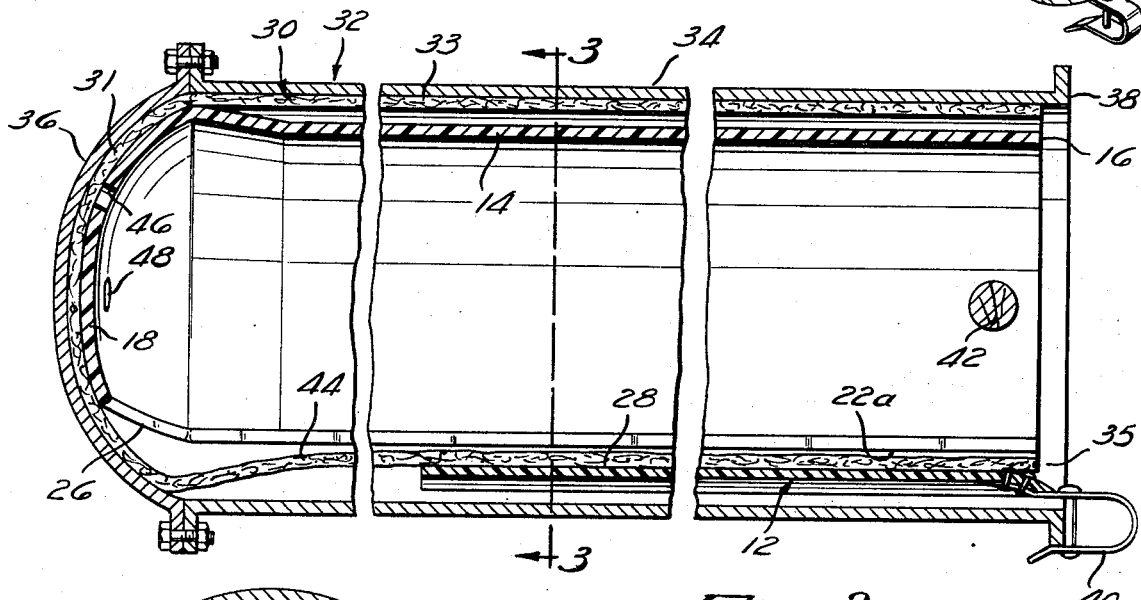
FIG. 2 is a composite sectional side view of the assembly shown in FIG. 1, a mold, and a preform.

FIG. 2 illustrates a hollow preform 30 positioned in a mold 32 by the assembly shown in FIG. 1. The mold 32 has a cylindrical portion 34 extending to an open rearward end 38 and a closed forward end 36. The preform 30 has a similar configuration and is comprised of a cylindrical portion 33 extending to a closed forward end 31 and an open rearward end 35.

In the method of the present invention, the preform 30 is initially positioned over the inserting mandrel 10 since the inserting mandrel has exterior dimensions less than the interior dimensions of the preform. The paddle 12 is positioned inside the mold 32 adjacent to the open end 38. To this end, the paddle 12 is provided with a handle 40 which is formed to clip over the open end 38 of the mold so as to securely position the paddle.

The inserting mandrel 10, with the preform 30 positioned over it, is then inserted into the mold. A handle 42 is provided across the open end 16 of the inserting mandrel to facilitate this step. As the preform is being inserted into the mold, the aperture 20 and the paddle 12 are appropriately aligned so as to coact in sliding relationship. As the preform 30, which lies intermediate the inserting mandrel 10 and the paddle 12, is inserted into the mold, the aperture 20 and the projecting surface 28 form an inwardly extending furrow 44 in the preform. As shown in FIG. 2, the preform 30 has been completely inserted into the mold and the furrow 44 has been formed in the preform. The furrow axially extends along substantially the entire axial length of the cylindrical portion 33 of the preform 30.

Figure 3:
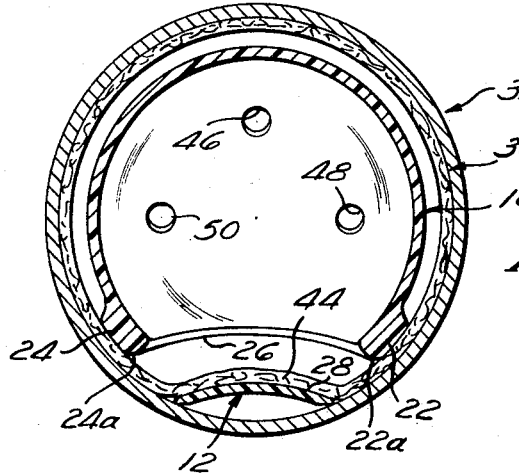
FIG. 3 is a sectional view, the plane of the section being indicated by the line 3—3 in FIG. 2.

As best shown in FIG. 3, the furrow 44 reduces the cross sectional size of the preform 30 by gathering portions of the preform material. To effect this gathering of preform material, the inserting mandrel 10 and the paddle 12 provide an increased circumferential path about which the preform must travel and a localized area where the excess preform material is accumulated.

Once the preform 30 has been properly positioned in the mold 32, the inserting mandrel 10 may be withdrawn from the mold by means of the handle 42.

Once the inserting mandrel and the paddle have been removed from the mold, the inflatable bag may be inserted into the preform and inflated so as to compress the preform against the inner surfaces of the mold. The furrow 44 which was formed in the preform will also be compressed and the portions of the preform formerly gathered in the furrow will be uniformly distributed throughout the preform. Consequently, the preform will be compressed uniformly against the inner surfaces of the mold and the subsequent molding steps, described above, may be performed.

When the method of the present invention is employed as described above, the preform does not have to be initially formed so as to satisfy the rigorous dimensional requirements imposed by the prior art techniques. In particular, the maximum interior mold dimensions do not limit the exterior dimensions of the preform and an oversized preform is no longer discarded as unusable. For example, when the method of the present invention is employed, a preform having an outside diameter 0.020 inch greater than the inside diameter of the mold is easily inserted into the mold and is usable. In effect, the upper limit of the narrow tolerance range of the prior art methods has been increased.

Since the exterior dimensions of the preform do not have to be substantially equal to the interior dimensions of the mold when the method of the present invention is employed, an experienced assemblyman is no longer required to carefully insert the preform into the mold without tearing or disrupting the exterior surface of the preform. In fact, when the method and assembly of the present invention are utilized, an inexperienced assemblyman is able to quickly and correctly insert the preform into the mold. Since the assembly of the present invention fits the preform to the mold as it is being inserted, production time is not wasted in a tedious fitting process.

The prior art problems with respect to the degree which the preform could be undersized or the amount of acceptable clearance between the preform and the mold are also eliminated by the method of the present invention. Since the method of the present invention utilizes oversized preforms, there is no need to provide a clearance between the preform and the mold and the problems of the prior art are substantially avoided. In particular, the preform will not tend to split as the inflatable bag compresses it against the inner surfaces of the mold, since the exterior dimensions of the preform are actually greater than the interior dimensions of the mold. In addition, the final product will not tend to have resin-rich areas at its exterior surface, since sufficient fiber-reinforcing materials are provided by the oversized preform.

The assembly of the present invention also radially aligns the preform within the mold as it is inserted. The mandrel support guides 22 and 24 provide the cylindrical portion 14 of the inserting mandrel 10 with a radial dimension equal to that of the expanded forward end 18. Thus, the support guides 22 and 24 and the forward end 18 provide a coplanar support surface for the inserting mandrel. The support guides and the forward end may be appropriately dimensioned so as to radially align the mandrel and the preform within the mold. This feature of the present invention is best illustrated in FIG. 3.

In addition, the end face 18 of the inserting mandrel is provided with apertures 46, 48, and 50 which permit the free passage of air. These apertures permit air to escape from the mold, through the preform lying intermediate the mold and the forward end, as the preform is inserted, and prevent the formation of a vacuum as the inserting mandrel is withdrawn from the preform.

Although a preferred embodiment of this invention is illustrated, it is to be understood that various modifications and rearrangements of parts may be resorted to without departing from the scope of the invention.

What is claimed is:

1. A method of inserting an oversized flexible preform into an opening in a hollow mold to lay up the preform against the inner surface of the mold, comprising the steps of providing mandrel means and paddle means, positioning said preform around said mandrel means, positioning said paddle means within said mold, inserting said mandrel means and preform into said mold and deflectingly engaging said preform between said mandrel and paddle means within said mold to thereby temporarily form at least one inwardly projecting furrow along said preform so as to reduce the cross sectional size of said preform so that said oversized preform fits said mold.

2. A method in accordance with claim 1, wherein said preform is formed of a fibrous material.

3. A method in accordance with claim 1, wherein the step of deflectingly engaging said preform includes providing support for maintaining said furrow in said preform along a substantial extent of the longitudinal length of said preform.

4. A method in accordance with claim 3, wherein said oversized preform is substantially cylindrical and has a closed forward end and said mandrel means includes a forward end dimensioned to press against said closed forward end of said preform during the step of inserting said mandrel means and preform into said mold.

5. A method in accordance with claim 4, wherein said furrow extends substantially axially along said oversized preform.

6. A method in accordance with claim 4 wherein the step of providing support for maintaining said furrow includes constraining said preform along a radially, inwardly projecting surface provided by said paddle means adjacent a recess provided by said mandrel means.

7. A method of inserting an oversized flexible preform into an opening in a hollow mold to lay up the preform against the inner surface of the mold, comprising the steps of providing a flexible preform having a cylindrical sidewall and a closed end, providing a mold having a mold cavity adapted to receive said preform, inserting said preform into said cavity by applying axial pressure to said closed end, while said pressure is applied, applying inwardly directed radial pressure to a longitudinal portion of the cylindrical sidewall within the mold cavity to reduce the circumference of said sidewall, maintaining said pressure along a substantial extent of said longitudinal portion until said preform is fully received in said mold cavity to thereby maintain a reduced preform circumference during and after preform insertion, removing said inwardly directed radial pressure, and then forcing all portions of said cylindrical sidewall against said mold cavity.

* * * * *